(12) United States Patent
Song et al.

(10) Patent No.: US 11,217,961 B2
(45) Date of Patent: Jan. 4, 2022

(54) OPTICAL DEVICE FOR SUPPRESSING NOISE OF LASER USING GRAPHENE

(71) Applicant: KOREA INSTITUTE OF SCIENCE AND TECHNOLOGY, Seoul (KR)

(72) Inventors: Yong-Won Song, Seoul (KR); Sungjae Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/840,451

(22) Filed: Apr. 6, 2020

(65) Prior Publication Data

US 2020/0335931 A1 Oct. 22, 2020

(30) Foreign Application Priority Data

Apr. 18, 2019 (KR) .......... 10-2019-0045324

(51) Int. Cl.
*H01S 3/067* (2006.01)
*H01S 3/10* (2006.01)

(52) U.S. Cl.
CPC ...... *H01S 3/10061* (2013.01); *H01S 3/06783* (2013.01); *H01S 3/06791* (2013.01)

(58) Field of Classification Search
CPC ............ H01S 3/10061; H01S 3/06783; H01S 3/06791; H01S 3/06712; H01S 3/005; H01S 3/1608; H01S 3/1061; H01S 2301/02; G02B 6/02052; G02B 26/00; G02B 5/30; G02B 5/20; G02B 1/04; B82Y 20/00
See application file for complete search history.

(56) References Cited

U.S. PATENT DOCUMENTS

| 9,285,534 | B2 | 3/2016 | Lee et al. | |
|---|---|---|---|---|
| 2005/0226278 | A1* | 10/2005 | Gu | H01S 3/0057 372/6 |
| 2011/0158268 | A1* | 6/2011 | Song | H01S 3/1118 372/18 |
| 2012/0140809 | A1* | 6/2012 | Krause | H04L 1/205 375/224 |
| 2013/0121353 | A1* | 5/2013 | Kub | H01S 3/1106 372/11 |
| 2015/0155681 | A1* | 6/2015 | Ozyilmaz | C23C 16/44 372/6 |

(Continued)

FOREIGN PATENT DOCUMENTS

| KR | 101028803 B1 | 4/2011 |
|---|---|---|
| KR | 101257309 B1 | 4/2013 |

(Continued)

OTHER PUBLICATIONS

X. M. Liu et al., "Graphene-clad microfibre saturable absorber for ultrafast fibre lasers," Nature, Scientific Reports, May 2016, vol. 6, No. 26024, 8 pages.

(Continued)

*Primary Examiner* — Xinning (Tom) Niu
(74) *Attorney, Agent, or Firm* — Cantor Colburn LLP

(57) ABSTRACT

Embodiments relate to a noise suppressor for suppressing noise of an optical signal, including a core through which the optical signal travels, a clad that is wrapped around the core and configured to expose part of the core, and a graphene layer formed on the part of the core, and a digital optical signal generation system including the same.

11 Claims, 11 Drawing Sheets

(56) References Cited

U.S. PATENT DOCUMENTS

2017/0187161 A1   6/2017   Fermann et al.
2017/0264070 A1*  9/2017   Cingoz ................ G02F 1/3551
2019/0027889 A1   1/2019   Song et al.

FOREIGN PATENT DOCUMENTS

KR        101382443 B1   4/2014
KR   1020190009962 A   1/2019

OTHER PUBLICATIONS

Yufeng Song et al., "Nonlinear Few-Layer Antimonene-Based All-Optical Signal Processing: Ultrafast Optical Switching and High-Speed Wavelength Conversion," Advanced Optical Materials, 2018, 10 pages, No. 1701287.

Young In Jhon et al., "Metallic MXene Saturable Absorber for Femtosecond Mode-Locked Lasers," Advanced Materials, 2017, 8 pages, No. 1702496.

Korean Notice of Allowance for KR Application No. 10-2019-0045324 dated Dec. 4, 2020.

\* cited by examiner

Blocking interaction with graphene

OPTICAL DEVICE FOR SUPPRESSING NOISE OF LASER USING GRAPHENE

CROSS-REFERENCE TO RELATED APPLICATION

This application claims priority to Korean Patent Application No. 10-2019-0045324, filed on Apr. 18, 2019, and all the benefits accruing therefrom under 35 U.S.C. § 119, the contents of which in its entirety are herein incorporated by reference.

BACKGROUND

1. Field

The present disclosure relates to technology that suppresses noise of a laser, and more particularly, to an optical device (hereinafter, a noise suppressor) having a noise suppression function by reducing noise of a laser used in optical signal processing using graphene (such as, for example, nanomaterials used for laser ultrashort pulse generation).

DESCRIPTION OF GOVERNMENT-SPONSORED RESEARCH AND DEVELOPMENT

This research is done in support of R&D project (Project Series Number: 1711082643) of Ministry of Science, ICT and Future Planning under the supervision of National Research Foundation of Korea.

2. Description of the Related Art

Generally, in the case of optical devices that operate at ultrahigh speed, laser modulation is performed to carry signals, and for effective processing of the optical signals, oxide crystals and semiconductor devices having superior optical nonlinear properties have been used. However, their large volume makes it difficult to keep up with advances of optical devices requiring integration, so recently, there are many studies on nano-scale materials having optical nonlinearity.

Among such materials, attention is being paid to various nanomaterials such as black phosphorus and carbon-based nanomaterials, for example, graphene. Black phosphorus is prone to oxidation by reaction with moisture in air and thus has low chemical durability, whereas graphene is easy to synthesize and delaminate, has stronger chemical durability, and can be coated on a target substrate relatively easily.

The graphene has a saturable absorption property that absorbs light of low intensity and allows light of high intensity to pass through. In case that the graphene is applied to a laser cavity, when an additional spectral component exists in the proximity of the center wavelength of the generated laser, the generated laser spectral components pass through the graphene with sufficient intensity, and when phase matching with the other spectral components is satisfied, constructive interference occurs. Thus, an instantaneous pulse laser is formed in the laser cavity.

To carry information over not only a continuous wave laser but also a pulse laser, the lasers are converted to an array of "1"s and "0"s in the time domain through a modulation process. When the oscillating laser coexists with noise in the laser cavity, there is a probability that an error may occur at the receiver end of the transmission link for the modulated optical signal.

To reduce the probability of error, there is an approach to amplify the laser signal, but additional power (i.e., energy) is required for amplification.

SUMMARY

According to an aspect of the present disclosure, there is provided a noise suppressor for suppressing noise of a laser using graphene.

An optical device for suppressing noise of a laser according to an aspect of the present disclosure may include a core through which the laser travels, a clad that is wrapped around the core, and a graphene layer that interacts with the laser and prevents a laser spectral component having energy that is equal to or less than a threshold in the laser from passing through.

In an embodiment, the graphene layer may be formed on a surface of a groove of the clad to expose part of the laser field radially centered at the core.

In an embodiment, the core may include a first core and a second core, the first core and the second core being spaced apart from each other, the clad may include a first clad and a second clad, and the graphene layer may be formed between the first core and the second core.

In an embodiment, the optical device may further include a cover wrapped around the clad and the graphene layer, and applied to fix the graphene layer.

In an embodiment, the graphene layer may be configured to prevent a laser spectral component having energy that is equal to or less than the threshold in the laser from passing through by absorbing the said laser spectral component.

In an embodiment, the graphene layer may be configured to allow a laser spectral component having energy that is higher than the threshold in the laser to pass through.

In an embodiment, the threshold may be determined based on a shape property or a material property of at least one of the core, the clad and the graphene layer.

In an embodiment, the shape property may include at least one of a diameter, a volume and a thickness of the core, the clad and/or the graphene.

In an embodiment, the material property may include at least one of concentration, dispersion and crystallinity.

An optical fiber ring cavity according to another aspect of the present disclosure is an optical fiber ring cavity with the optical device according to the above-described embodiments for generating a continuous wave laser, and may include a polarization controller that controls polarization of a laser within the cavity and transmits the laser to the optical device, an amplifier that amplifies the laser having passed through the optical device, and a coupler that splits the amplified laser for a laser output.

A digital optical signal generation system according to still another aspect of the present disclosure is a digital optical signal generation system with the optical device according to the above-described embodiments, and may include a continuous wave laser cavity that generates a continuous wave laser, an optical modulator that embeds digital signals onto the continuous wave laser, and a pattern generator that transmits an electrical control signal to the optical modulator.

An optical fiber pulse laser according to further another aspect of the present disclosure may be configured to transmit a pulse laser to the optical device according to the above-described embodiments.

The noise suppressor according to an aspect of the present disclosure absorbs a laser spectral component of noise level having lower energy than a predetermined threshold, and allows a laser spectral component having high energy to pass through.

Hence, a general continuous wave laser, to which the noise suppressor is applied, has a distinct difference between laser having high energy of a specific oscillating wavelength and ambient noise having low energy of a different wavelength. Eventually, the use of the noise suppressor achieves continuous wave laser oscillation with higher quality.

Additionally, when the continuous wave laser is modulated to generate a digital optical signal, there is a distinct difference between an optical signal having high energy state representing a value of "1" in the digital optical signal and an optical signal having low energy state representing a value of "0" in the digital optical signal, thereby certainly distinguishing between the two signals. Eventually, when the digital optical signal is generated using the noise suppressor, there is a reduction in the probability of error at the receiver end of the optical signal transmission link.

As the probability of error is reduced by the use of the noise suppressor, additional amplification is not required to improve the probability of error. Accordingly, there is no need for a considerable amount of additional power (generally referred to as power penalty) required for the additional amplification. That is, using the noise suppressor, it is possible to obtain high accuracy with low power consumption without additional amplification.

Additionally, the noise suppressor may be configured to suppress noise by interaction of graphene with only part of the evanescent field of the laser. Accordingly, even though the noise suppressor interacts with a strong laser, damage of graphene is minimized, and the noise suppressor has a long lifetime and high durability in terms of the quality of graphene.

The effects of the present disclosure are not limited to the above-mentioned effects, and other effects not mentioned herein will be clearly understood by one of ordinary skill in the art from the appended claims.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure only and are not intended to be limiting of the present disclosure. Additionally, for clarity of description, the accompanying drawings may show variously modified elements such as exaggerated and omitted elements.

DETAILED DESCRIPTION

The terminology used herein is for the purpose of describing particular embodiments only and is not intended to be limiting of the present disclosure. As used in the present disclosure and the appended claims, the singular forms include the plural forms as well, unless the context clearly indicates otherwise. The term "comprises" or "includes" when used in this specification, specifies the presence of stated features, regions, integers, steps, operations, elements, and/or components, but does not preclude the presence or addition of one or more other features, regions, integers, steps, operations, elements and/or components. Furthermore, it should be understood that "and/or" as used herein includes any or all possible combination of one or more relevant items.

It will be further understood that when an element is referred to as being "on" another element, it can be immediately on the other element or intervening elements may be present. In contrast, when an element is referred to as being "immediately on" another element, there is no intervening element.

The terms "first", "second", and the like may be used to describe various parts, components, regions, layers and/or sections, but they are not limited thereto. These terms are used to distinguish one part, component, region, layer or section from another. Accordingly, a first part, component, region, layer or section as used herein may be referred to as a second part, component, region, layer or section without departing from the scope of the present disclosure.

Unless otherwise defined, all terms (including technical and scientific terms) used herein have the same meaning as commonly understood by one of ordinary skill in the art. It will be understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

Hereinafter, the embodiments of the present disclosure will be described in detail with reference to the accompanying drawings.

Figure 1:
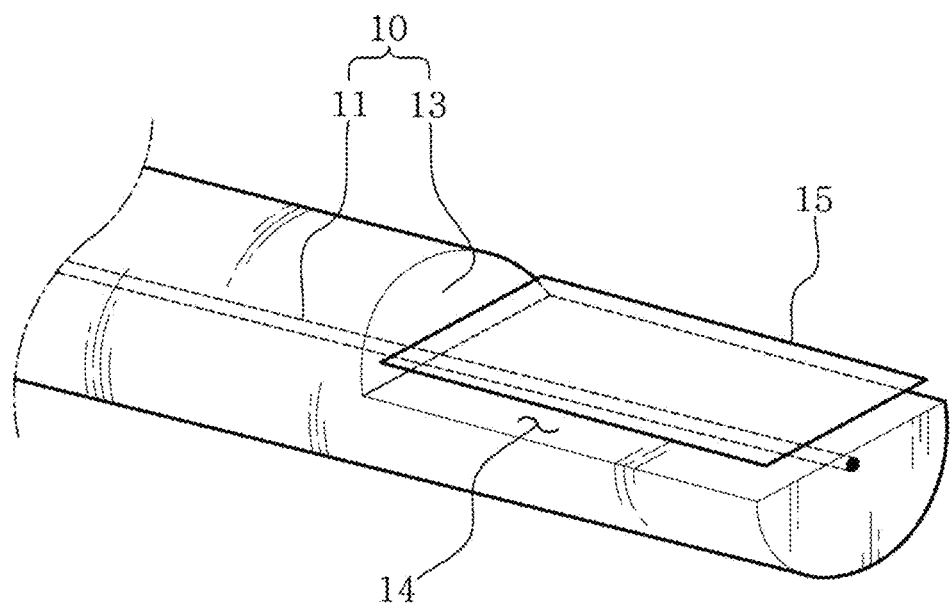
FIG. 1 is a conceptual diagram of a noise suppressor according to an embodiment of the present disclosure.
Figure 1:
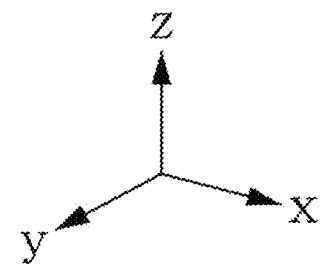

FIG. 1 is a conceptual diagram of a noise suppressor according to an embodiment of the present disclosure.

Referring to FIG. 1, the noise suppressor 100 includes graphene and an optical fiber 10, and for example, includes a core 11, a clad 13 and a graphene layer 15.

The core 11 is formed in a transmission direction of a laser, i.e., a axial direction of an optical fiber (for example, x axis of FIG. 1), and the laser travels through the core 11. The core 11 is formed from a material having a higher refractive index than the clad 13.

The clad 13 is wrapped around the core 11, and is configured to expose part of the core 11. For example, part of the clad 13 is formed by lateral polishing to form a groove 14. In an embodiment, the groove 14 is formed with a D-shaped cross-section structure having a plane.

The graphene layer 15 is formed from graphene having carbon nanostructure. The noise suppressor 100 is configured such that graphene interacts with part of an evanescent field of the laser. In an embodiment, the graphene layer 15 is formed on the exposed part of the core 11. As shown in FIG. 1, the graphene layer 15 is disposed on the groove 14 where the clad 13 is removed (for example, by polishing).

In an embodiment, the graphene layer 15 may be formed by spray coating, and the graphene layer 15 may be formed in a single layer or multiple layers. However, the graphene layer 15 is not limited thereto. In another embodiment, the graphene layer 15 may be synthesized on a Cu foil by CVD and transferred onto the core 11.

The graphene layer 15 suppresses noise included in an optical signal traveling through the core 11 by interaction with the optical signal.

Figure 2:
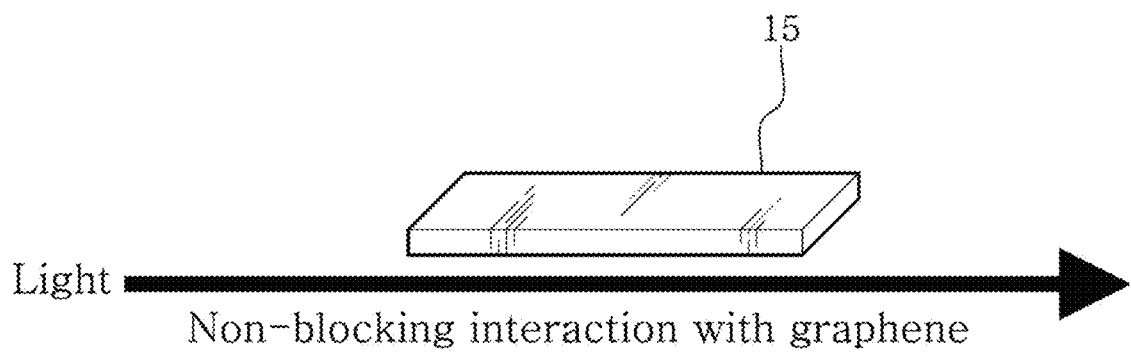
FIG. 2 is a conceptual diagram illustrating the working principle of the noise suppressor of FIG. 1.

FIG. 2 is a conceptual diagram illustrating the working principle of the noise suppressor of FIG. 1.

FIG. 2 shows a laser transmitted through the core 11 extending along the x-axis direction of FIG. 1. The graphene layer 15 disposed outside of the core 11 is formed in a direction parallel to the x-axis direction of FIG. 1. Accordingly, as shown in FIG. 2, the laser within the core 11 is not physically blocked by the graphene layer 15 and is continuously transmitted. The laser within the core 11 is guided along the light path by a difference in refractive index between the core 11 and the clad 13.

When the refractive index outside of the core 11 is low, the mode field of the optical signal within the core 11 propagates in a region having a lower average refractive index.

In FIG. 1, when the noise suppressor 100 has the clad 13 made of silica having the average refractive index of approximately 1.5, the groove 14 region formed by removing the clad 13 is made of air having the average refractive index of approximately 1. By the polishing, the average refractive index of the groove 14 region is lower than the clad 13 outside of the core 11, and eventually, the mode field of the laser propagates in the groove 14 region.

Here, the tail part of the propagating mode field is referred to as an evanescent field. Noise is suppressed by interaction between the propagating mode field (or the evanescent field) in the groove 14 region and the graphene layer 15.

Figure 3:
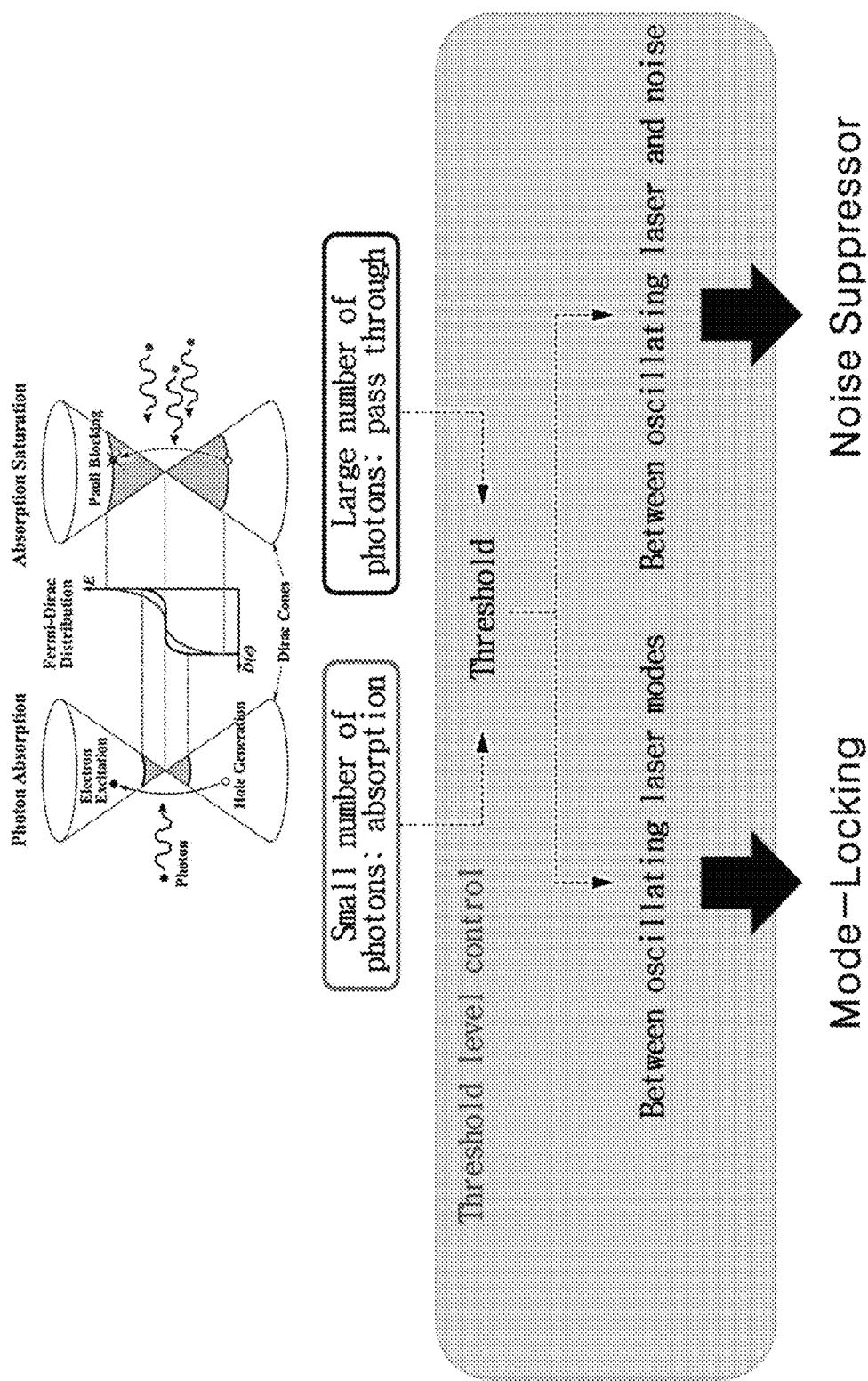
FIG. 3 is a conceptual diagram illustrating the working principle of a noise suppressor according to an embodiment of the present disclosure.

FIG. 3 is a conceptual diagram illustrating the working principle of the noise suppressor according to an embodiment of the present disclosure.

Graphene has a point band gap structure. By this structure, the wavelength for saturable absorption of graphene is not limited by an energy band gap.

When photons meet graphene, the photons are absorbed by the graphene and interact with electrons in the graphene, which stimulates and excites the electrons from the valance energy band to the conduction energy band of the graphene. The photon absorption of the graphene relies on the number of photons related to nonlinear saturable absorption of the graphene.

As shown in FIG. 3, a small number of photons may be absorbed by excitation of electrons from the lower branch of Dirac cone of FIG. 3 to the upper branch of the energy band structure of graphene. The electrons generate holes in the valance energy band, and are excited to the conduction energy band across the energy bandgap corresponding to the wavelength of photons. The resulting Dirac-fermion satisfies Fermi-Dirac distribution.

With the increasing number of photons, the generated carriers occupy the energy state on a level in which more electron excitation is not permitted by the Pauli principle of expulsion of the carriers at the edge of the filled band. When graphene meets an optical signal having a smaller number of photons than the level, the graphene absorbs the optical signal to disallow the optical signal to pass through. On the contrary, when graphene meets an optical signal having a larger number of photons than the level, the graphene allows the optical signal to pass through. That is, a laser having higher intensity than the threshold is allowed to pass through. But the other laser that is equal to or lower intensity than the threshold is prevented from passing through, thus disallowed to pass through the graphene.

Noise is found as a signal having very low energy compared to a signal desired by a user. Accordingly, the graphene layer 15 is configured to absorb, as noise, an optical signal having lower energy than a preset threshold in the optical signal guided in the core 11.

For example, when the level of saturable absorption of the graphene layer 15 is the threshold for noise suppression and is determined such that the threshold for noise suppression is between the intensity of oscillating laser in the laser cavity and the intensity of noise, a laser corresponding to the noise level having intensity that is equal to or less than the threshold is not allowed to pass through the graphene layer 15. On the contrary, a laser having higher intensity than the threshold survives and keeps traveling even after the laser meets the graphene layer 15.

That is, the threshold corresponds to energy in a state in which nonlinear absorption of the graphene layer 15 is initiated, representing the number of photons that induce nonlinear absorption.

In an embodiment, the threshold may be determined based on the physical property of at least one of the core 11, the clad 13 and the graphene layer 15. The physical property includes a shape property such as diameter, volume and thickness, and a material property of the core, the clad and/or the graphene (e.g., each component 11, 13, 15). For example, the material property of the graphene layer 15 includes concentration of graphene, dispersion and crystallinity of graphene.

The threshold is determined to absorb a laser having low energy of noise level based on the physical property of the spectral components and the intensity of the oscillating laser. For example, when the diameter of the core 11 is approximately 8 um, the threshold is determined as a value within the range between 0.5 mW and 1 mW according to the condition of a sample.

By the threshold of the graphene layer 15, the noise suppressor 100 interacts with the received laser, and absorbs a laser having low energy less than the threshold to disallow it to pass through, and on the contrary, allows a laser having high energy equal to or higher than the threshold to pass through.

As a result, while the laser passes through the noise suppressor 100 region, noise of the laser signal having low energy that is less than the threshold is filtered out, thereby suppressing noise of the oscillating laser.

That is, the threshold for noise suppression of the noise suppressor 100 described with reference to FIG. 3 is not aimed at distinguishing between oscillating laser spectral components in the laser cavity, and is aimed at distinguishing between oscillating laser and ambient noise.

The graphene layer 15 is not thermally damaged by the action of the evanescent field in which only part of the laser field radially centered at the core 11 reacts with the graphene layer 15. In the core 11 of the noise suppressor 100, a raw material that burns at the optical intensity of about 15 dBm does not burn at a higher optical intensity and stably works. That is, damage caused by heat is minimized through the way the evanescent field works, and thus the carbon nanostructure of the graphene layer 15 is stably maintained in the application of high output laser, and as a result, the noise suppressor 100 has long lifetime and high durability in respect of the graphene layer 15.

Figure 4:
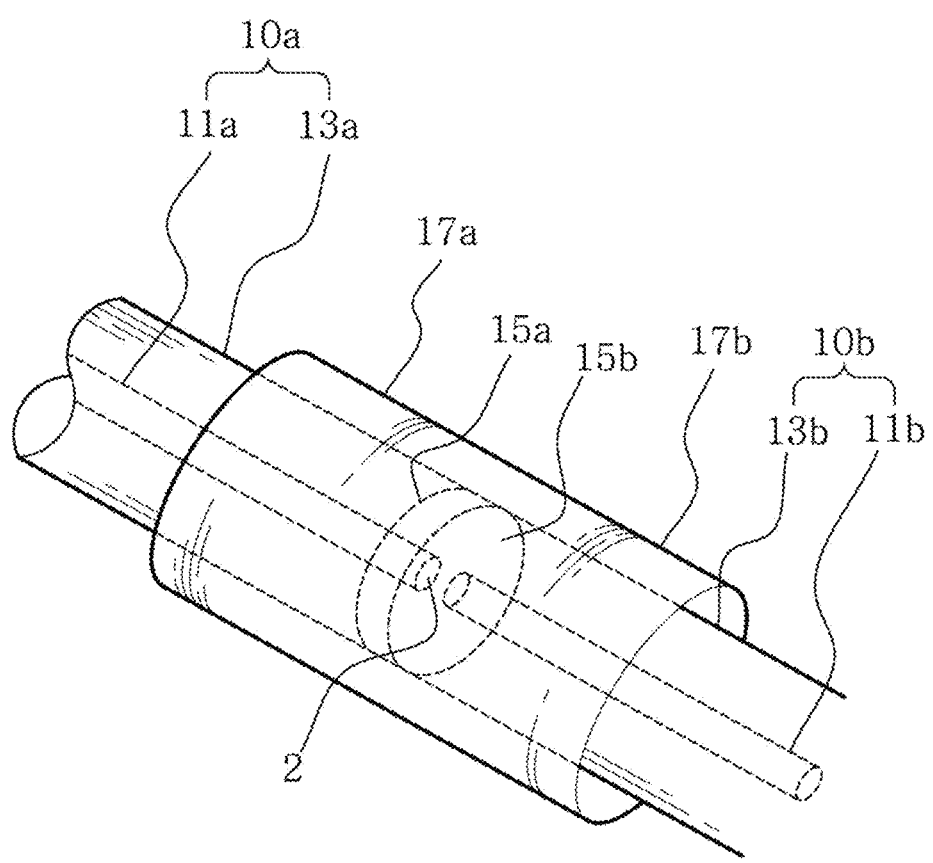
FIG. 4 is a configuration diagram of a noise suppressor according to another embodiment of the present disclosure.

FIG. 4 is a configuration diagram of the noise suppressor 200 according to another embodiment of the present disclosure.

The structure of the noise suppressor 200 of FIG. 4 is similar to the structure of the noise suppressor 100 of FIG. 1, and the same elements are indicated through the same reference signs and their detailed description is omitted herein.

Referring to FIG. 4, the noise suppressor 200 includes two optical fibers 10a, 10b and a graphene layer 15. For example, the noise suppressor 200 includes cores 11a, 11b, clads 13a, 13b and a graphene layer 15. The cores 11a, 11b are spaced apart from each other along a direction. The clads 13a, 13b are wrapped around the cores 11a, 11 b respectively.

The noise suppressor 200 is configured such that a laser directly penetrates graphene. In an embodiment, the graphene layer 15 is formed in a gap between the cores 11a, 11b, and come into contact with the cores 11a, 11b. In some embodiments, the noise suppressor 200 may further include a cover 17. The cover 17 fixes the connection between the optical fibers 10a, 10b and the graphene layer 15. The cover 17 may be configured to act as a sleeve.

Figure 5:
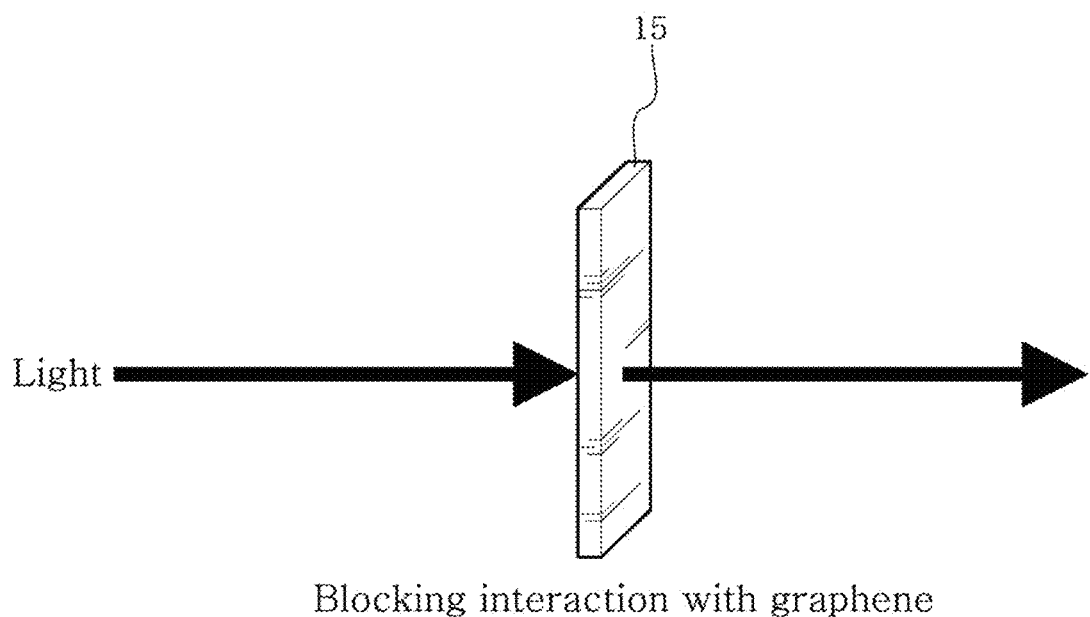
FIG. 5 is a conceptual diagram illustrating the working principle of the noise suppressor of FIG. 4.

FIG. 5 is a conceptual diagram illustrating the working principle of the noise suppressor of FIG. 4.

The surface of the graphene layer 15 is connected to receive a laser through the core 11a. For example, when the core 11a is formed along the x axis as shown in FIG. 4, the surfaces of the graphene layer 15 are formed in parallel on the yz plane.

By the connection structure, as shown in FIG. 5, the noise suppressor 200 receives a laser such that the laser penetrates through, and interacts with the received laser to filter out a laser of noise level and allow a laser having higher energy to pass through.

Additionally, using the noise suppressor 200, it is possible to acquire a digital optical signal having an error level desired by the user with less energy consumption.

The noise suppressor 100, 200 of FIGS. 1 and 4 may be used in various optical signal processing applications such as an optical fiber ring resonator for continuous wave laser oscillation, a digital optical signal generation system and an optical fiber pulse laser.

Figure 6:
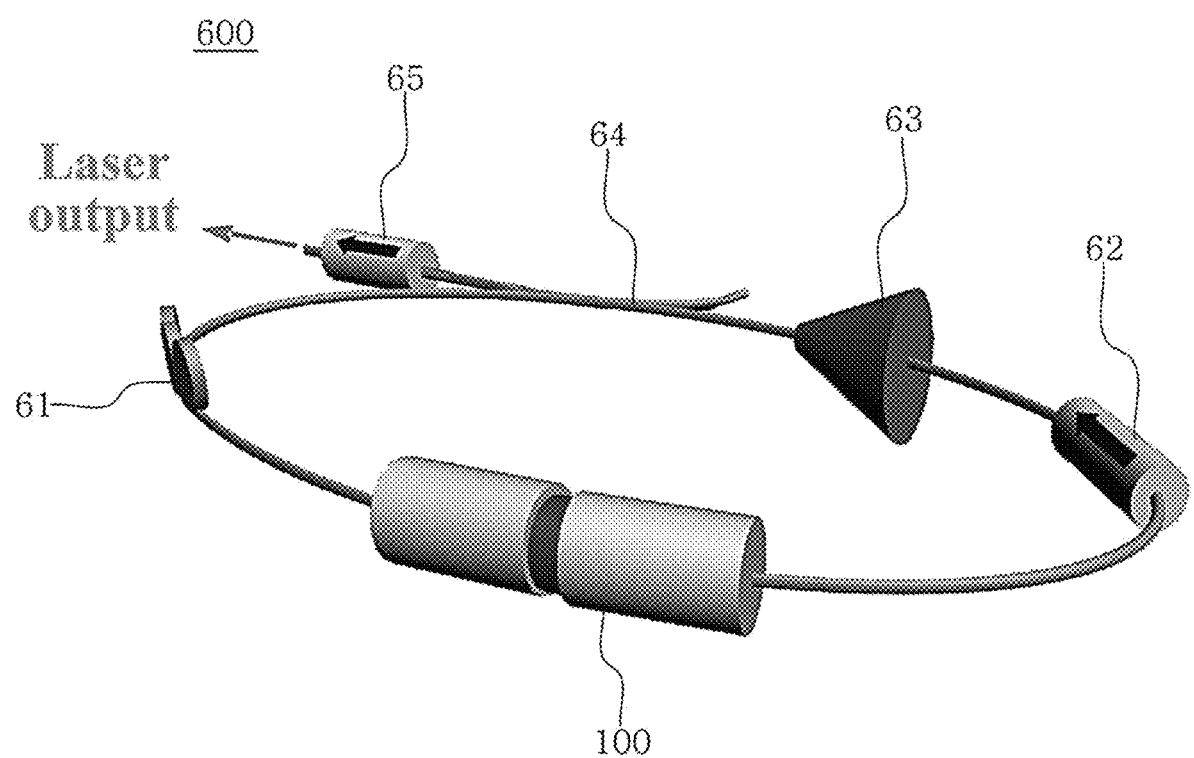
FIG. 6 is a configuration diagram of an optical fiber ring cavity with a noise suppressor according to an embodiment of the present disclosure.

FIG. 6 is a configuration diagram of an optical fiber ring resonator with the noise suppressor according to an embodiment of the present disclosure.

When the noise suppressor 100 is applied to the optical fiber ring resonator 600 for continuous wave laser oscillation, the noise suppressor 100 increases the extinction ratio of the continuous wave laser.

Referring to FIG. 6, the optical fiber ring resonator 600 is configured to oscillate a continuous wave laser from the laser inputted from a laser oscillator (not shown), and for example, includes a polarization controller (PC) 61, the noise suppressor 100, an isolator 62, an amplifier 63 and a coupler 64. Each component 61, 62, 200, 63, 64 is optically connected to form a laser resonator.

The laser transmitted to the optical fiber ring resonator 600 is transmitted to the polarization controller 61. The polarization controller 61 controls the polarization of the laser so that the laser signal satisfies the polarization state condition for continuous wave laser oscillation.

As described above, the noise suppressor 100 interacts with the laser traveling in the optical fiber ring resonator 600, and among the components included in the laser, the noise suppressor 100 removes, as noise, a laser spectral component having energy that is equal to or less than the threshold, and allows a laser spectral component having higher energy than the threshold to pass through.

The noise suppressed laser travels to the amplifier 63 through the isolator 62 that prevents the backflow. The amplifier 63 outputs a laser having high output by amplifying the laser traveling in the optical fiber ring resonator 600. In an embodiment, the amplifier 63 may be an Er-doped fiber amplifier (EDFA).

The amplified laser is split by the coupler 64 and outputted to the outside of the optical fiber ring resonator 600. The continuous wave laser outputted from the optical fiber ring resonator 600 may be transmitted to a laser analyzer (not shown) (for example, OAS) through the isolator 65.

Figure 7:
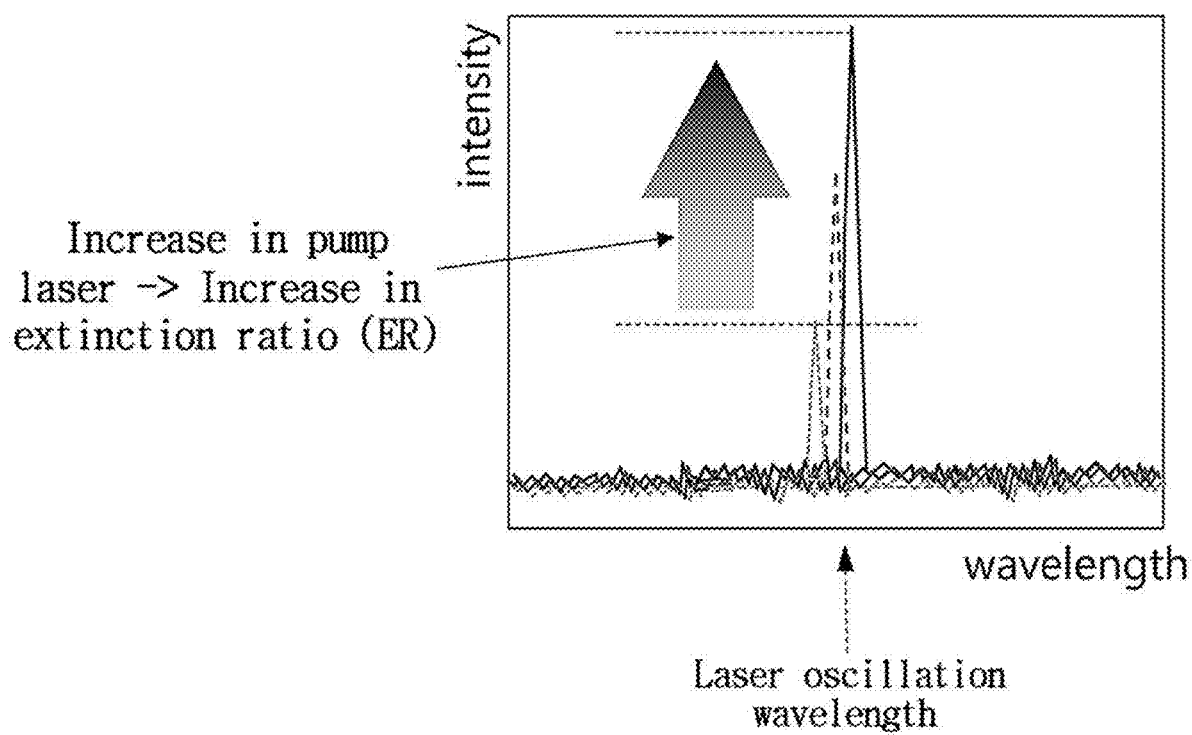
FIG. 7 is a diagram illustrating a change in output of a continuous wave laser obtained by applying a noise suppressor to the optical fiber ring resonator of FIG. 6.

FIG. 7 is a diagram illustrating a change in output of the continuous wave laser obtained by applying the noise suppressor to the optical fiber ring resonator of FIG. 6.

Referring to FIG. 7, the diagram shows a change in output of the continuous wave laser obtained through the presence or absence of the noise suppressor 100 in the wavelength domain.

As the noise suppressor 100 disallows noise to pass through, even though the intensity of a pump laser increases, a low energy spectral component remains nearly unchanged.

In contrast, as the noise suppressor 100 allows a high energy spectral component to pass through, when the intensity of a pump laser increases, the output of the continuous wave laser having high energy increases as well.

As described above, when the noise suppressor 100 is applied to the optical fiber ring resonator 600 for continuous wave oscillation, there is a distinct difference between laser having high energy of a specific wavelength and ambient noise having low energy of a different wavelength, thereby achieving continuous wave laser oscillation with higher quality.

The optical fiber ring cavity 600 of FIG. 6 can obtain the same effect even when the noise suppressor 200 is applied, and it will be obvious to those skilled in the art that modification may be made to the connection feature.

Figure 8:
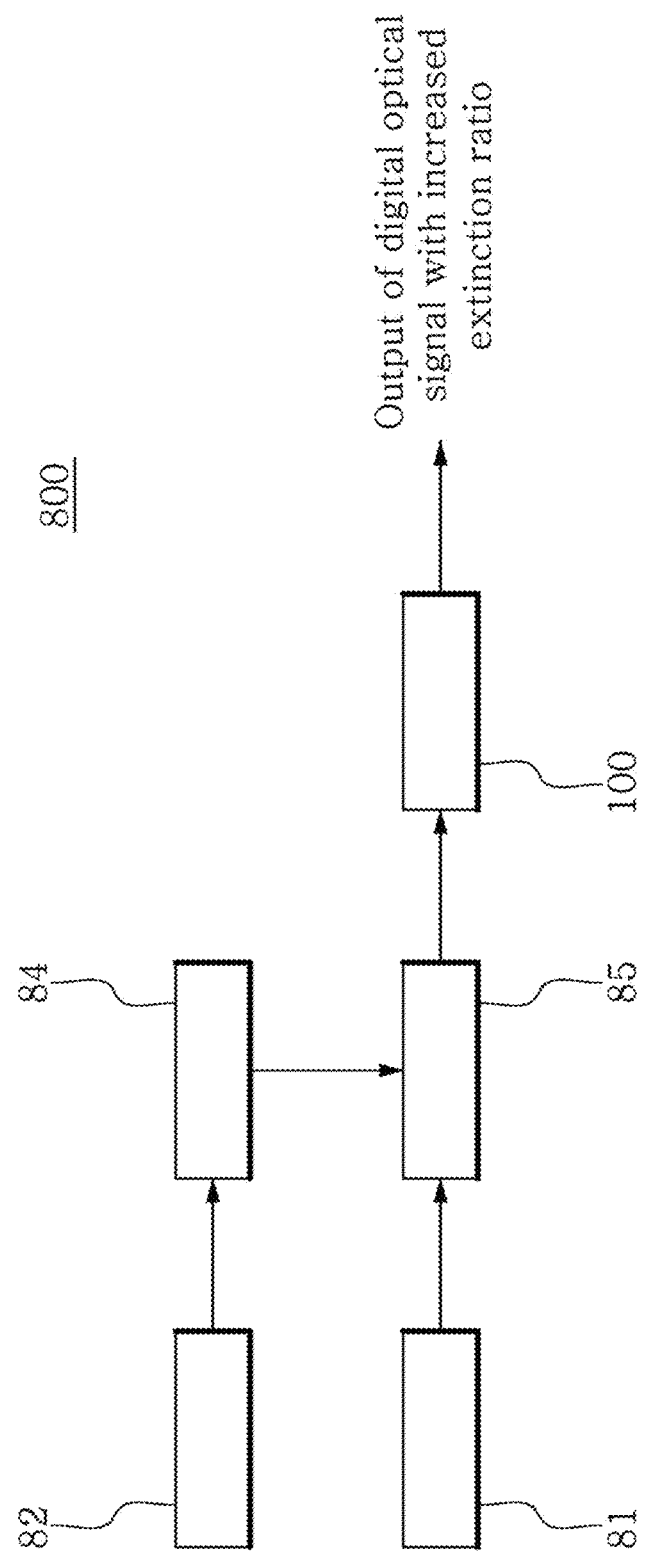
FIG. 8 is a configuration diagram of a digital optical signal generation system with a noise suppressor according to an embodiment of the present disclosure.

FIG. 8 is a configuration diagram of a digital optical signal generation system with the noise suppressor according to an embodiment of the present disclosure.

Referring to FIG. 8, the digital optical signal generation system 800 is configured to convert a continuous wave laser to a digital optical signal. For example, the digital optical signal generation system 800 includes a continuous wave laser oscillator 81, a pattern generator 82, an amplifier 84, an optical modulator 85 and the noise suppressor 100.

The continuous wave laser oscillator 81 is configured to oscillate a continuous wave laser that maintains a predetermined intensity. The continuous wave laser oscillator 81 may be, for example, a laser diode.

The pattern generator 82 provides the optical modulator 85 with an electrical control command corresponding to information to be carried over the continuous wave laser. For example, the pattern generator 82 may provide the modulation control command for information expressed as "1" or "0".

The optical modulator 85 receives the modulation control command of the pattern generator 82 through the amplifier 84. The optical modulator 85 outputs a laser representing "1" or a laser representing "0" by applying the modulation control command to the continuous wave laser. For example, the modulation control command may be a command for on/off of the continuous wave laser, and the optical modulator 85 may output a modulation signal by on/off of the continuous wave laser in response to the modulation control command.

The modulation signal is inputted to the noise suppressor 100. The modulation signal interacts with the graphene layer 15 of the noise suppressor 100, leading to a distinct difference between an optical signal having high energy state representing a value of "1" in the digital optical signal and an optical signal having low energy state representing a value of "0" in the digital optical signal.

Figure 9:
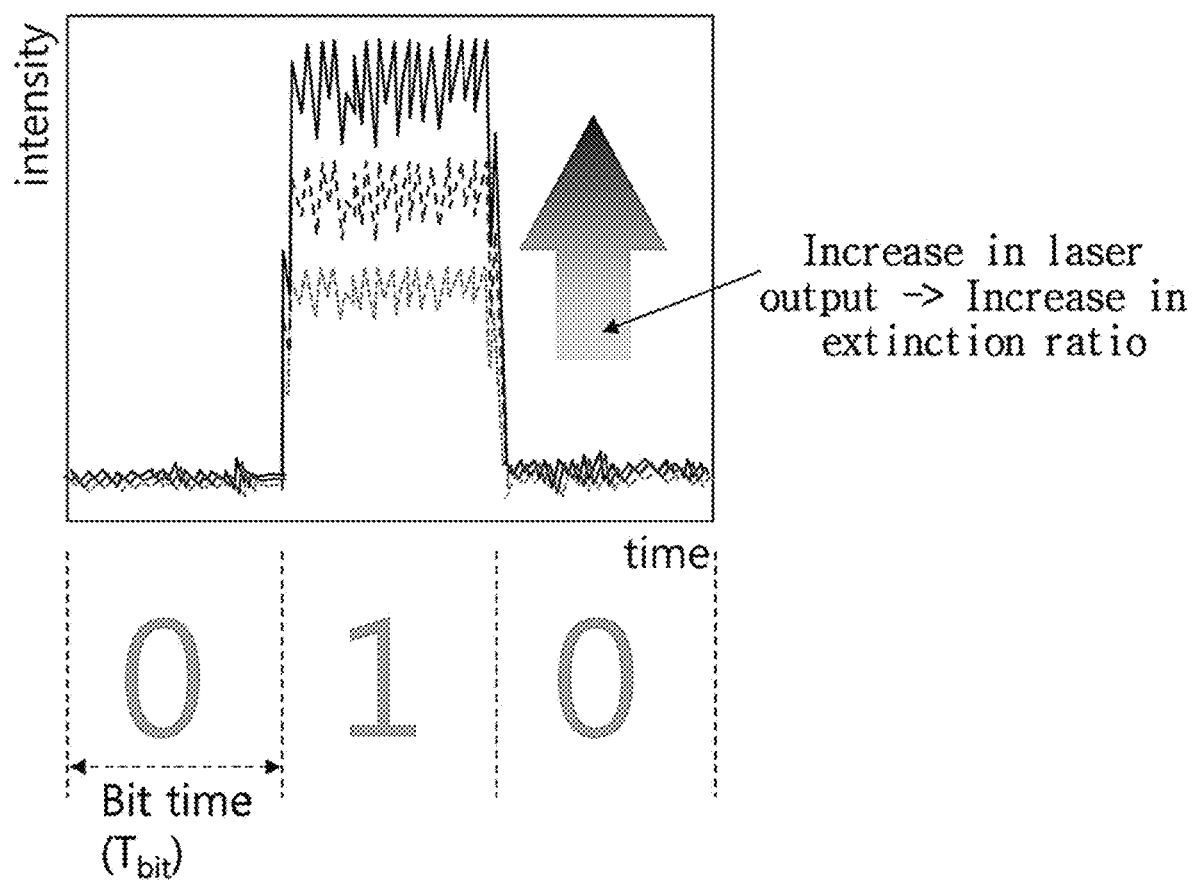
FIG. 9 is a diagram illustrating a change in digital optical signal by a noise suppressor in FIG. 8.

FIG. 9 is a diagram illustrating a change in digital optical signal by the noise suppressor in FIG. 8.

FIG. 9 shows a change in extinction ratio of the modulated digital optical signal, obtained through the noise suppressor 100, on the time domain. The modulation signal includes components representing "0" and "1".

The noise suppressor 100 disallows the modulation signal having low energy representing "0" to pass through. It is because the modulation signal having low energy has energy of noise level. Accordingly, even though the output of the laser increases, the intensity of the modulation signal representing "0" is outputted from the noise suppressor 100 as it remains nearly unchanged.

In contrast, the noise suppressor 100 allows the modulation signal having high energy representing "1" to pass through. Accordingly, when the output of the laser increases, the intensity of the modulation signal passing through the noise suppressor 100 increases as well.

As a result, the receiver end of the digital optical signal transmission link, as a digital optical signal, the modulation signal in which two signals representing "1" and "0" can be certainly distinguished, and thus, when the digital optical signal is generated based on the modulation signal, the probability of error reduces.

Even when the noise suppressor 200 is applied to the digital optical signal generation system 800 of FIG. 8, the same effect can be obtained, and it will be obvious to those skilled in the art that modification may be made to the connection feature.

Figure 10:
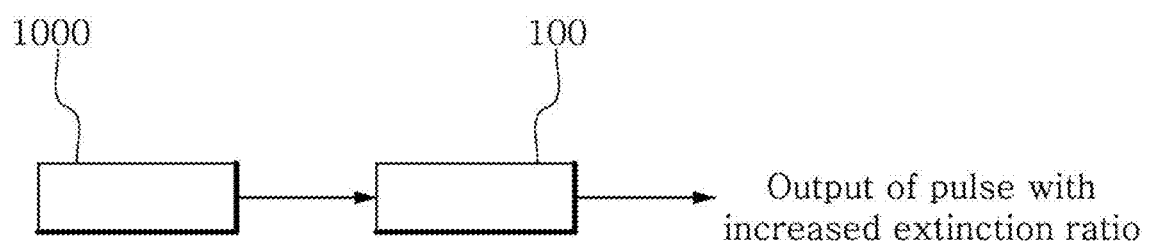
FIG. 10 is a configuration diagram of an optical fiber pulse laser with a noise suppressor according to an embodiment of the present disclosure.

FIG. 10 is a configuration diagram of an optical fiber pulse laser with the noise suppressor according to an embodiment of the present disclosure.

Referring to FIG. 10, a pulse laser outputted from the optical fiber pulse laser 1000 is inputted to the noise suppressor 100. Then, the graphene layer 15 of the noise suppressor 100 outputs the pulse laser with the increased extinction ratio by interaction with the input pulse laser.

Figure 11:
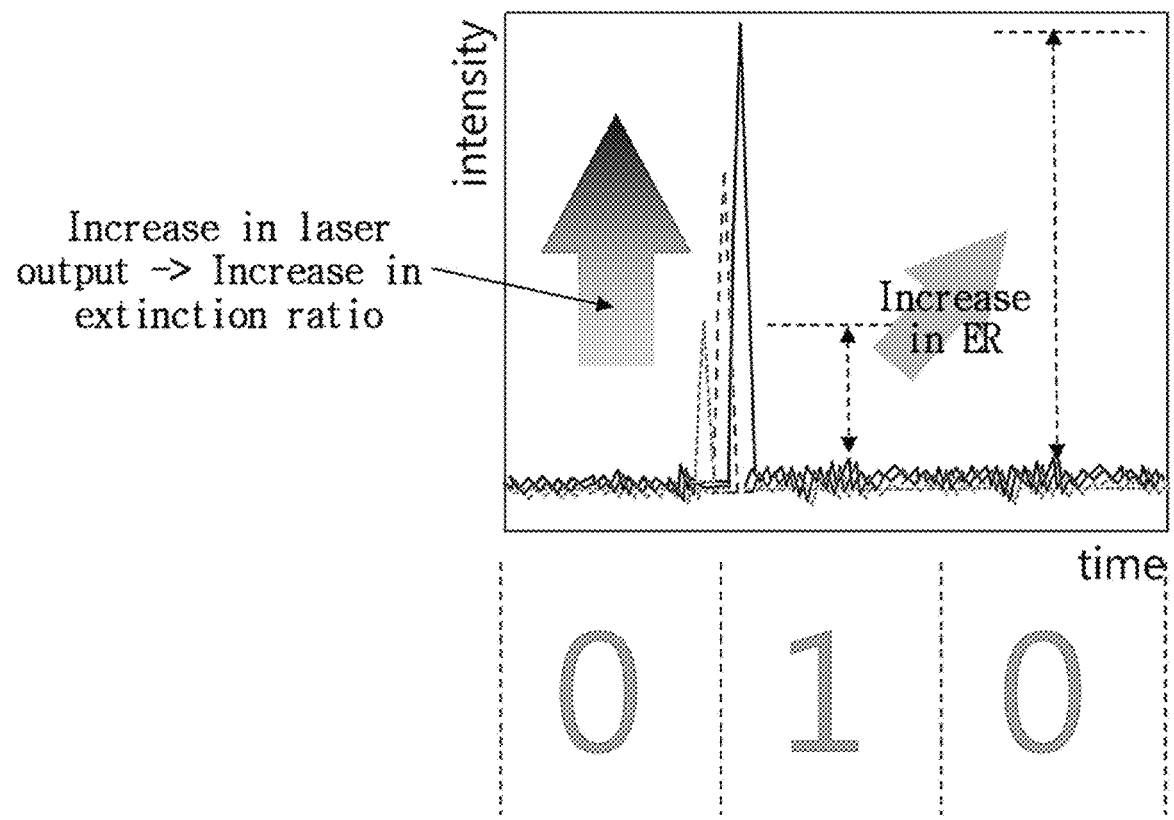
FIG. 11 is a diagram illustrating a change in output of pulse laser by a noise suppressor in FIG. 10.

FIG. 11 is a diagram illustrating a change in output of pulse laser by the noise suppressor in FIG. 10.

FIG. 11 shows a change in the extinction ratio of ultra-short pulse laser, obtained through the noise suppressor, on the time domain. The noise suppressor 100 disallows a pulse laser having low energy that is equal to or less than the threshold to pass through. Accordingly, even though the output of laser increases, the intensity of the pulse laser having low energy is outputted from the noise suppressor 100 as it remains nearly unchanged.

In contrast, the noise suppressor 100 allows a pulse laser having high energy representing "1" to pass through. Accordingly, when the output of laser increases, the intensity of the pulse laser passing through the noise suppressor 100 increases as well.

It will be obvious to those skilled in the art that the pulse laser 1000 of FIG. 10 can obtain the same effect even when the noise suppressor 200 is applied.

As described above with reference to FIGS. 6 to 11, it is possible to increase the extinction ratio by simply optically connecting the noise suppressor 100, 200 to an application. Accordingly, it is possible to realize an extinction ratio desired by the user without using an electronic device in which the extinction ratio of the output signal requires additional energy supply or additional energy consumption.

While the present disclosure has been hereinabove described with reference to the embodiments shown in the drawings, this is provided for illustration purposes only and it will be appreciated by those having ordinary skill in the art that various modifications and variations may be made thereto. However, it should be noted that such modifications fall within the technical protection scope of the present disclosure. Therefore, the true technical protection scope of the present disclosure should be defined by the technical spirit of the appended claims.

DETAILED DESCRIPTION OF MAIN ELEMENTS

10: Optical fiber
11: Core
13: Clad
14: Groove
15: Graphene layer
17: Cover
61: Polarization controller
62, 65: Isolator
63, 84: Amplifier
64: Coupler
81: Continuous wave laser oscillator
82: Pattern generator
85: Optical modulator
100, 200: Noise suppressor
600: Optical fiber ring resonator
800: Digital optical signal generation system
1000: Optical fiber pulse laser

What is claimed is:

1. An optical device for suppressing noise of a laser, comprising:
   a core through which the laser travels;
   a clad that is wrapped around the core; and
   a graphene layer that interacts with the laser which travels through the core and prevents the noise in the laser from passing through,
   wherein a shape property or a material property of at least one of the core, the clad and the graphene layer is set to have a threshold energy level between 0.5 milliwatts (mW) and 1 mW, and the noise has an energy less than the threshold energy level.

2. The optical device according to claim 1, wherein the graphene layer is formed on a surface of a groove of the clad to expose part of the laser field radially centered at core.

3. The optical device according to claim 1, wherein the core includes a first core and a second core, the first core and the second core being spaced apart from each other,
   the clad includes a first clad and a second clad, and the graphene layer is formed between the first core and the second core.

4. The optical device according to claim 3, further comprising:
a cover wrapped around the clad and the graphene layer and applied to fix the graphene layer.

5. The optical device according to claim 1, wherein the graphene layer prevents the noise in the laser to pass through by absorbing the noise.

6. The optical device according to claim 1, wherein the graphene layer allows a laser spectral component having energy that is higher than the threshold energy level in the laser to pass through.

7. The optical device according to claim 1, wherein the shape property includes at least one of a diameter, a volume and a thickness of the core, and/or the clad.

8. The optical device according to claim 1, wherein the material property includes at least one of concentration, dispersion and crystallinity of the core, and/or the clad.

9. An optical fiber ring cavity with the optical device according to claim 1 for generating a continuous wave laser, comprising:
a polarization controller that controls polarization of a laser within the cavity and transmits the laser to the optical device;
an amplifier that amplifies the laser having passed through the optical device; and
a coupler that splits the amplified laser for a laser output.

10. A digital optical signal generation system with the optical device according to claim 1, comprising:
a continuous wave laser cavity that generates a continuous wave laser;
an optical modulator that embeds digital signals onto the continuous wave laser; and
a pattern generator that transmits an electrical control signal to the optical modulator.

11. An optical fiber pulse laser for transmitting a pulse laser to the optical device according to claim 1.

* * * * *